Figure 1:
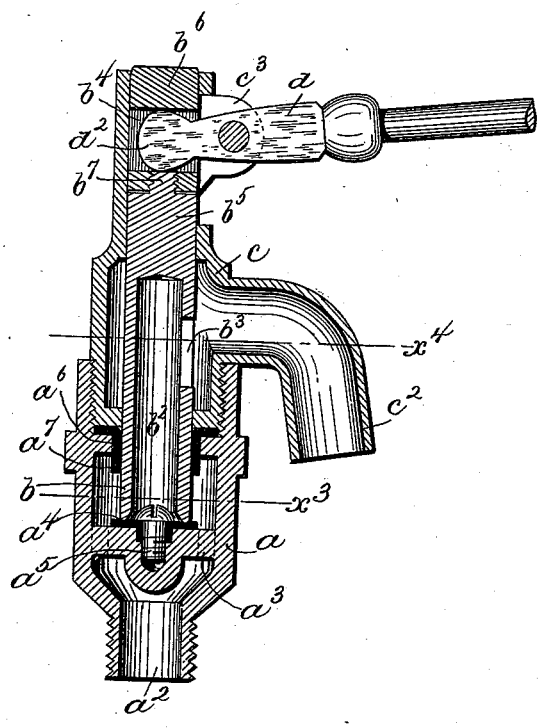

(No Model.)

W. SCOTT.
BALL COCK.

No. 547,968. Patented Oct. 15, 1895.

Witnesses
Jas. J. Maloney.
J. P. Livermore

Inventor,
William Scott,
by Jos. P. Livermore
Att'y.

UNITED STATES PATENT OFFICE.

WILLIAM SCOTT, OF MEDFORD, ASSIGNOR TO THE DALTON-INGERSOLL COMPANY, OF BOSTON, MASSACHUSETTS.

BALL-COCK.

SPECIFICATION forming part of Letters Patent No. 547,968, dated October 15, 1895.

Application filed April 22, 1895. Serial No. 546,663. (No model.)

*To all whom it may concern:*

Be it known that I, WILLIAM SCOTT, of Medford, county of Middlesex, State of Massachusetts, have invented an Improvement in Ball-Cocks, of which the following description, in connection with the accompanying drawings, is a specification, like letters on the drawings representing like parts.

The present invention relates to a ball cock or valve adapted to be operated by a float to control the inlet to a tank, such as a flushing-tank for water-closets.

The main object of the invention is to provide a valve or cock of this nature the outlet to which may be adjusted for different water-supply pressures in order to prevent too rapid a flow of water into the tank where the valve is used with a high-pressure supply, and thus prevent unnecessary noise and spattering.

The invention also consists in certain details of construction which result in a very positive operation of the valve and a diminution of the objectionable noise and gurgling which often accompany the operation of such devices.

The valve embodying the present invention consists, mainly, in a hollow stem longitudinally movable in a suitable valve-chamber in response to the movement of a float, and the said hollow stem co-operates at its lower end with a valve-seat within said valve-chamber, so that when it is lifted therefrom the water is admitted from said chamber into the said stem. In order that the lifting of said stem from the said seat and the consequent admission of water to the said stem may result in admitting water to the tank in connection with which the device is used, a port is provided in the side of said stem communicating with an outlet, so that the water admitted to said stem passes through said port and outlet into the tank. The said port is normally so placed as to be in full direct communication with the outlet-chamber; but the stem is adapted to be turned with relation thereto, so that a portion of said port is cut off or closed by a portion of the valve-casing in the said outlet-chamber, thus making a smaller opening for the delivery of water than is normally the case. Thus, with the valve-port constructed to allow, when fully open, sufficient flow of water under the lowest pressure commonly encountered, it will be seen that the same valve can be used for much higher pressures by turning the stem thereof, so as to partially choke or close the port through which the water escapes. Thus the same valve may be used in various places where pressures vary, or, if need be, a valve may be regulated should there come a variation in pressure in the place where it was first installed.

Figure 2:
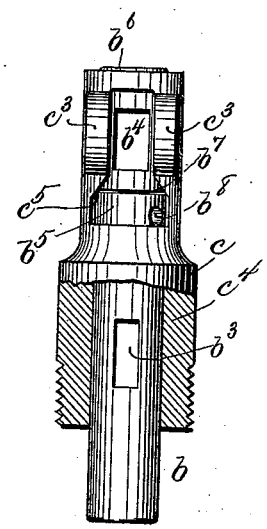
Figure 3:
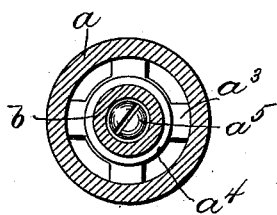

Figure 1 is a vertical section of the valve-chamber, valve-outlet, and operating-stem, the said stem being shown as adapted to be operated by a float. (Not shown.) Fig. 2 is a front view of the upper portion of the apparatus with the operating-lever removed and the lower part in longitudinal section to show the valve-stem and outlet-port thereof. Fig. 3 is a sectional plan on line $x^3$, Fig. 1, of the valve-chamber, showing the valve-seat in plan; and Fig. 4, a section on line $x^4$, Fig. 1.

Figure 4:
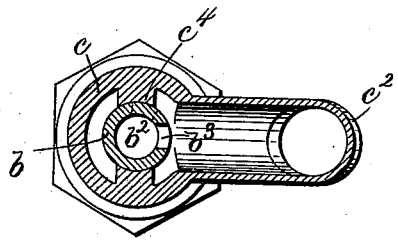

Referring to Fig. 1, the valve-chamber $a$ is provided with an inlet $a^2$ and a bridge $a^3$, (see Fig. 3,) supporting the valve-seat $a^4$, preferably provided with a yielding face or washer held in position by a screw $a^5$. Thus the water is at all times free to enter the valve-chamber $a$ through the inlet $a^2$ and the openings between the bridge-supports, but is then confined within said chamber by the valve stem $b$, entering said chamber through the opening $a^6$, provided with the cup leather or packing $a^7$, which prevents leakage along the outside of the said valve-stem. The valve-stem $b$ is made hollow or provided with an internal passage or duct $b^2$, and its lower end is normally seated, when the valve is closed, upon the valve-seat $a^4$, thus preventing the water in the chamber $a$ from passing into the said duct $b^2$. When, however, the said stem is lifted from the seat $a^4$, it is obvious that the water in the chamber will flow upward into the said passage $b^2$ thereof, and thence outward through a port $b^3$ in the side of said stem, the said port $b^3$ opening into the outlet-chamber in the casing $c$, which is provided with an outlet-spout $c^2$ and with a guide-support for the valve-stem and a support for the operating device $d$. In order to lift and lower the said valve-stem and thus open and close the valve, the operating device $d$, which is an arm or lever provided at its outer end with the usual float, (not herein shown,) is pivoted between lugs $c^3$ upon the upper part of the casing $c$, and the inner end thereof $d^2$ extends into an opening $b^4$ in the upper part of the stem $b$, so that as the said pivotal arm or float-lever $d$ rocks on its pivot it moves the stem $b$ up or down. Thus assuming that the device is used as an automatic ball-cock, when the float falls, carrying downward the outer end of the operating device $d$, the inner end $d^2$ thereof is lifted, carrying with it the valve-stem $b$ and unseating the lower end of said stem and admitting water from the chamber $a$ to the duct $b^2$, and thence through the port $b^3$ to the outlet-chamber and spout or nozzle $c^2$, discharging the water therefrom. In order that the effective size of the port $b^3$ may be varied for varying pressures, the stem $b$ is formed in two parts $b^5$ and $b^6$, connected together by a swivel-joint, (shown as a screw-threaded stem $b^7$,) so that the lower part $b^5$, which contains the hollow bore $b^2$ and lateral outlet-port $b^3$ may be turned with relation to the upper part, thus moving the port $b^3$ with relation to the internal projection $c^4$ of the wall of the casing $c$, as indicated in dotted lines, Fig. 4, so that the said port is covered or closed to any desired extent by said projection $c^4$, the inner surface of which fits closely upon the outer surface of the valve-stem, thus regulating the effective area of said port. As the valve-stem is turned about its longitudinal axis, assuming that the position shown in dotted lines, Fig. 4, is the extreme cut-off position of the valve, it is obvious that the area of opening may be varied by turning the stem to any intermediate position between that and the full-line position in the same figure. In order that this adjustment, due to the turning of the stem $b$, may be readily accomplished, the front portion of the upper part of the casing $c$ is provided with an opening $c^5$, Fig. 2, through which the stem $b$ may be reached to turn the same, and means are provided for thus turning it, consisting, as shown, in this instance of a hole or opening $b^8$, into which a small rod or nail may be inserted and the stem turned thereby. The arrangement of the valve is such that after it has been opened by the descent of the float it will close gradually in response to the upward movement of the float as the water rises in the tank, the said movement, however, obviously acting against the water-pressure exerted at the upper or closed end of the duct $b^2$, the outlet therefrom being, as shown, through the side of the stem. Thus the float will meet with somewhat more than normal resistance; but as the stem $b$ approaches nearly to the seat $a^4$ the opening between the bottom of the said stem and the said seat, growing gradually smaller, will cut off the pressure inside of the stem, relieving the strain upon the float, so that at the end of the operation the said float will suddenly bob up and close the valve promptly.

When the device is used, as shown, in an upright position, moreover, it is obvious that after the valve is closed water will stand in the stem $b^2$ up to the level of the lower side of the outlet-opening from the outlet-chamber, so that when the said valve is opened the water, instead of rushing at once into an open air-space, will meet standing water, thus greatly lessening the gurgling sound ordinarily attendant upon the working of a valve of this nature.

That part of the valve which operates as a water cut-off is at the lower part of the device, and the water is confined within the chamber $a$ by means of the packing $a^7$, so that the actuating portions—that is, the upper portion of the valve-stem and the actuating-lever $d$—may all be loosely fitted, so as to be easily operated without danger of binding or sticking. It is to be noted that by forming an enlargement or chamber around that portion of the valve-stem which contains the outlet-opening the effective area of the said outlet-opening is not varied by the longitudinal movement of the valve-stem in opening and closing the valve, as would be the case if the portion of the valve-stem containing said outlet-opening were closely inclosed except for a port adapted to register therewith when the valve is in its open position. Further than this, when the size of the port is varied—for example, made smaller to accommodate higher pressure of the water—the greater force of the stream issuing therefrom will be exerted upon the walls of the chamber and body of water contained therein instead of at the outlet of the discharge-nozzle, so that the water will issue from said nozzle in a steady stream of small capacity, whether the pressure be low and the valve-outlet fully open or the pressure high and the valve partly closed, the said discharge-nozzle being of sufficient capacity to discharge by gravity substantially all of the water that is delivered by the valve into the outlet-chamber, so that the water issues from said nozzle without pressure, and consequently without concussion with or agitation of the water in the tank.

The invention is not necessarily limited to the exact details herein shown and described, since modifications might obviously be made without departing from the invention.

I claim—

1. The combination of the valve chamber and a valve seat therein, of a hollow rotatable valve stem extending into said chamber and having an open end adapted to cooperate with the valve seat therein, a port or opening in the said valve stem outside of the said valve chamber, an outlet chamber communicating with said port and having a portion of its wall cooperating with said stem whereby the effective area of the said port is regulated by rotating said stem, substantially as described.

2. The combination with a valve shell or case having a valve chamber provided with a valve seat, and an outlet chamber provided with a discharge spout, of a tubular valve extending through said outlet chamber into said valve chamber and cooperating with said valve seat therein; the inner diameter of said outlet chamber being substantially greater than the external diameter of the valve and thereby producing an intermediate water space, and said valve having an adjustable outlet port opening into said water space, substantially as and for the purpose described.

3. The combination with the casing containing the valve and outlet chambers and an upwardly extending guiding portion; of a two part valve stem the lower part of which is adapted by its longitudinal movement to open communication between said chambers, the parts of said stem being so connected that one is rotatable with relation to the other, an operating lever pivoted in ears or lugs upon the upper portion of the casing and cooperating with the upper part of said stem to provide for the longitudinal movement thereof; an opening in the casing to expose the lower part of the valve stem for the rotation thereof, the port in said valve stem within the outlet chamber cooperating with a portion of said chamber to vary the effective area of said port when the said stem is rotated, substantially as and for the purpose described.

In testimony whereof I have signed my name to this specification in the presence of two subscribing witnesses.

WILLIAM SCOTT.

Witnesses:
   H. J. LIVERMORE,
   M. E. HILL.